United States Patent [19]

Rupp et al.

[11] Patent Number: 4,579,386

[45] Date of Patent: Apr. 1, 1986

[54] RECLINER MECHANISM

[75] Inventors: James A. Rupp, Pioneer; John M. Bramhall, Montpelier, both of Ohio

[73] Assignee: Kustom Fit Manufacturing Company, South Gate, Calif.

[21] Appl. No.: 573,006

[22] Filed: Jan. 23, 1984

[51] Int. Cl.[4] .................................. A47C 1/027
[52] U.S. Cl. ...................... 297/355; 297/361; 297/367
[58] Field of Search ............... 297/355, 361, 366, 367, 297/368, 369; 248/408, 407, 423; 108/146; 74/582, 586; 403/108, 107, 166

[56] References Cited

U.S. PATENT DOCUMENTS

| | | | |
|---|---|---|---|
| 2,018,825 | 10/1935 | Wood | 297/355 X |
| 3,024,067 | 3/1962 | Brandoli | 297/355 |
| 3,046,055 | 7/1962 | Martens | 297/361 |
| 3,398,986 | 8/1968 | Homier | 297/361 X |
| 4,218,091 | 8/1980 | Webster | 297/361 X |
| 4,384,742 | 5/1983 | Wisniewski | 297/353 |
| 4,402,546 | 9/1983 | Johnson | 297/355 X |

FOREIGN PATENT DOCUMENTS

| | | | |
|---|---|---|---|
| 1334083 | 6/1963 | France | 403/108 |
| 1539901 | 9/1968 | France | 297/361 |
| 1046893 | 10/1966 | United Kingdom | 297/355 |

Primary Examiner—William E. Lyddane
Assistant Examiner—José V. Chen
Attorney, Agent, or Firm—Fulwider, Patton, Rieber, Lee & Utecht

[57] ABSTRACT

A recliner mechanism for a reclinable vehicle chair having a back frame pivotally mounted to a seat frame. The recliner mechanism includes a pair of members pivotally attached between the seat and back frames and relatively extensible and retractable to adjust the angle of inclination of the back frame to the seat frame. One of the members includes an elongate slot having a plurality of detents, and a handle is pivotally carried by the other member. The handle includes an element extending through and freely longitudinally slidable in the slot in release position of the handle. In a locking position of the handle the element is located within one of the detents and holds the back frame in a fixed position of adjustment relative to the seat frame.

6 Claims, 12 Drawing Figures

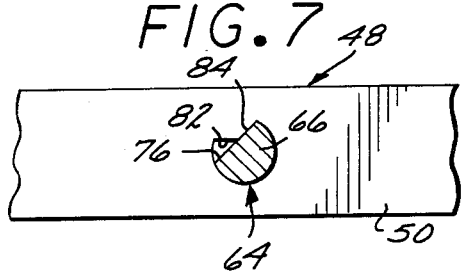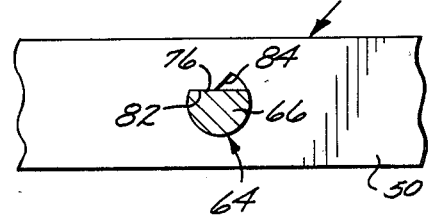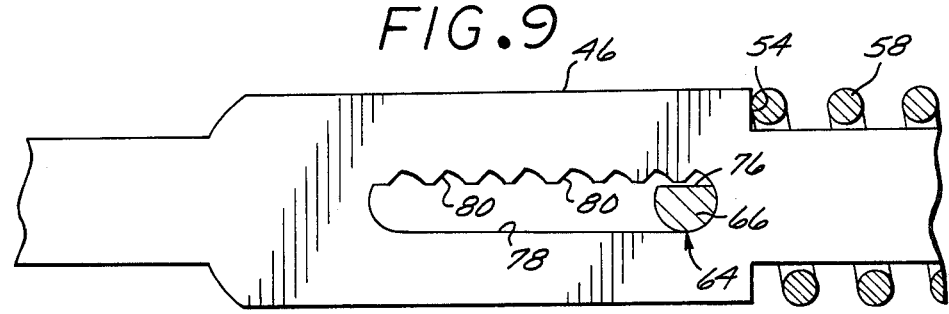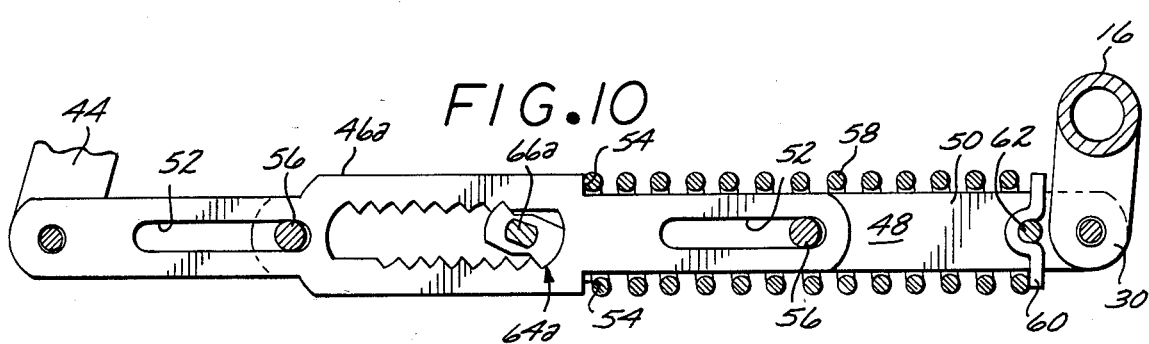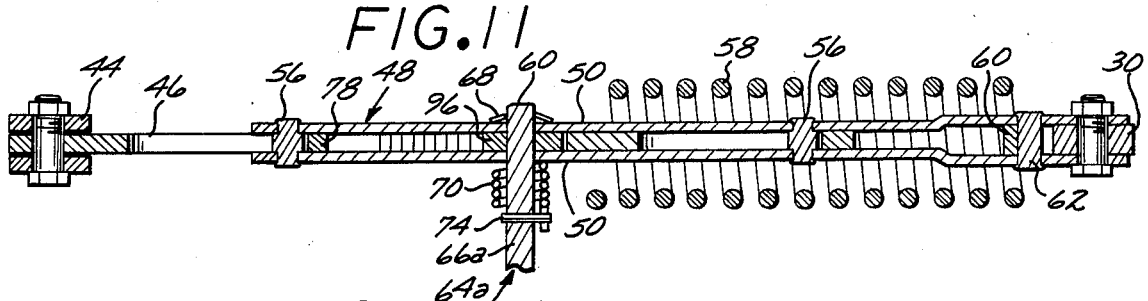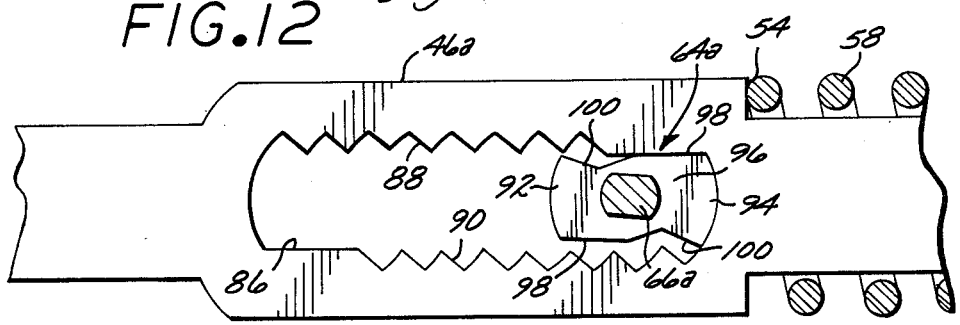

RECLINER MECHANISM

BACKGROUND OF THE INVENTION

1. Field of the Invention

The present invention relates to a recliner mechanism for a chair, and more particularly to a handle operated recliner mechanism adapted for mounting to a vehicle chair.

2. Description of the Prior Art

Recliner mechanisms for vehicle chairs are in common use, a typical example being the driver's chair of a recreational vehicle. The recliner mechanism of such a chair allows the driver to adjust the angle of the seat back to best suit his or her driving need. Sometimes recliner chairs are also provided for the passengers but usually they used less expensive fixed chairs.

In a vehicle driver application the recliner mechanism must be capable of easy operation by means of a readily accessible handle, and then it must be sufficiently rugged to withstand extended use with little or no maintenance. Above all, the recliner mechanism must be relatively simple and easy to manufacture to reduce its ultimate cost to the buyer.

One form of prior art recliner mechanism is disclosed in U.S. Pat. No. 4,218,091, issued Aug. 9, 1980 to David L. Webster. In that patent the recliner mechanism comprises a fluid cylinder which is extensible and retractable to pivot the back frame relative to the seat frame. The cylinder is of a type commonly employed in automobiles to adjust the raised position of "lift-back" rear hatches. It includes a laterally extending touch lever movable between release and lock positions to allow the seat back to be pivoted and then locked in an adjusted position. Such a recliner mechanism operates reasonably well, but its major disadvantage is its relatively high cost. Various other recliner mechanisms are utilized in the prior art, but they are also either relatively expensive to manufacture, or are complex, unreliable over extended periods of use, or are awkward to operate.

SUMMARY OF THE INVENTION

According to the present invention, a vehicle chair recliner mechanism is provided which comprises a pair of members having outer extremities for attachment to the back and seat frames of the chair, the angle of inclination of the back frame being adjusted upon relative extension and retraction of the pair of members. One member includes an elongate slot defining a plurality of detents. The other member pivotally mounts a handle which includes an element extending through the slot. In a release position of the handle the element is freely slidable in the slot to allow the back frame to be rearwardly inclined to a desired position. In locking position of the handle the element is pivoted into one of the detents to lock the back frame in an adjusted position. A bias means or spring is mounted to the pair of members to bias the back frame toward an upright position.

Other objects and features of the invention will become apparent from consideration of the following description taken in connection with the accompanying drawings.

BRIEF DESCRIPTION OF THE DRAWINGS

FIG. 7 is an enlarged view taken along the line 7—7 of FIG. 3, and illustrating the handle element in its locking position;

FIG. 8 is a view similar to FIG. 7, but illustrating the handle element in its release position;

FIG. 9 is a view similar to FIG. 6, but illustrating the handle element in its release position;

FIG. 10 is a side elevational view of a second embodiment of recliner mechanism according to the present invention;

FIG. 11 is a longitudinal cross-sectional view of the second embodiment of FIG. 10; and FIG. 12 is an enlarged detail view of a portion of the second embodiment of FIG. 10, particularly illustrating a modified handle element and detent configuration.

DESCRIPTION OF THE PREFERRED EMBODIMENTS

Figure 1:
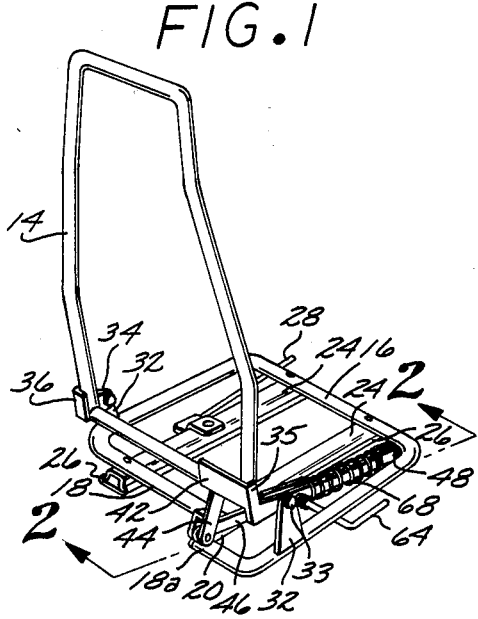
FIG. 1 is a perspective view of a vehicle chair incorporating a recliner mechanism according to the present invention.

Referring now to the drawings, there is illustrated a vehicle chair 10 according to the present invention and comprising, generally, a seat frame 12 adapted for mounting to relatively fixed structure (not shown), such as the floor of a motor vehicle, and a back frame 14 mounted to the seat frame 12 for pivotal movement between the generally upright position illustrated and an inclined position (not shown) in which the back frame 14 is tipped back relative to the seat frame 12.

A recliner mechanism 15 according to the present invention is coupled between the seat frame 12 and the back frame 14. It is operative to adjust the angle of inclination of the back frame 14, as will be seen.

The recliner mechanism 15 is particularly adapted for use in a vehicle chair 10, but it is also adapted for use in other types of structures, such as home or office furniture. Moreover, although the components of the chair 10 are shown as having a particular configuration, it will be apparent that other configurations may be employed if desired. The components illustrated are primarily constituted of lightweight structural tubing and metal plate appropriately covered with cushions and other upholstery (not shown), including a pair of arm rests and the like. Details of such upholstery are not a part of the present invention and are therefore omitted for brevity.

The tubular, generally square seat frame 12 includes a front portion or tube 16 and a rear portion or tube 18. The tube 18 has an offset or jog in it, the longer section of the tube 18 extending from the left side of the seat frame past the midpoint of the chair. There it is welded to the front portion of a short, longitudinally oriented plate 20, as best seen in FIG. 1. The shorter end of the tube 18, designated 18a, extending from the right side of the seat frame 12 is welded to the rearward portion of the plate 20.

A pair of parallel, downwardly opening, longitudinally extending, and transversely spaced apart channels 24 are secured to the underside of the seat frame 12 and are longitudinally slidable within a pair of complemental tracks 26 adapted to be secured to the vehicle floor. Although not shown in detail since the arrangement is not part of the present invention, an elongated locking arm 28 is operative by a person seated in the chair 10 to permit longitudinal slidable movement of the seat frame 12 back and forth upon the tracks 26.

Figure 2:
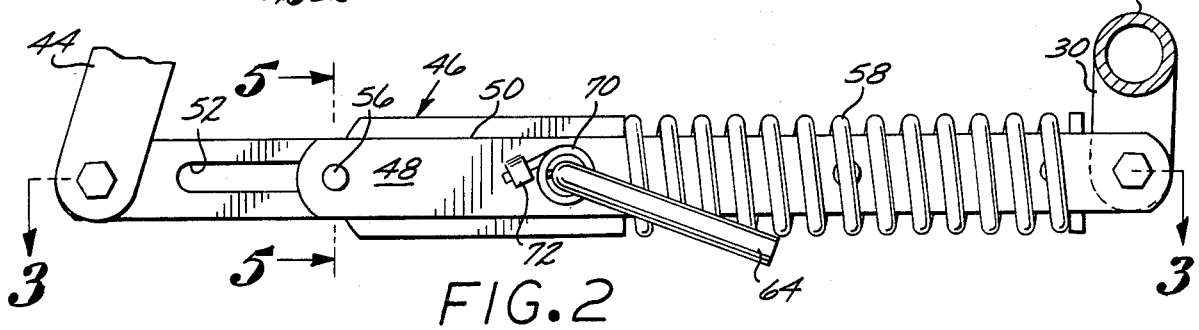
FIG. 2 is an enlarged view taken along the line 2—2 of FIG. 1.

Depending from the front tube 16 is an abutment or mounting tab 30, as best seen in FIG. 2, whose purpose will subsequently be described.

A pair of supports or hinge plates 32 project upwardly from opposite sides of the seat frame 12 adjacent the rear tubes 18 and 18a and include aligned openings defining a transversely oriented horizontal pivot axis 33.

A pair of supports or hinge plates 34 and 35 are located at the opposite lower corners of the back frame 14. The plate 34 includes an opening for receiving a suitable pivot fastener to allow pivotal movement of the back frame 14 about the pivot axis 33. The plate 34 also includes a transverse section 36 welded to the rear side of the left corner of the back frame 14.

The hinge plate 35 on the opposite side of the back frame 14 is generally similar to the plate 34, including an opening for receiving a suitable pivot fastener to allow pivotal movement of the back frame 14 about the pivot axis 33, and including a rear section 42 which extends inwardly to generally overlie the plate 20.

A downwardly and rearwardly inclined abutment or mount 44 is welded to the rear section 42 and terminates in a downwardly open, channel shape extremity. As will be apparent, rearward or clockwise movement of the lower extremity of the mount 44 about the axis 33 tilts the back frame 14 forwardly, while forward or counterclockwise movement of the mount 44 tilts the back frame 14 rearwardly.

The vehicle chair 10 thus far described is well known in the prior art and shown, for example, in the aforementioned U.S. Pat. No. 4,218,091.

The recliner mechanism 15 which is best illustrated in FIGS. 2-9 is uniquely adapted for use with the vehicle chair 10. It comprises elongate first and second members 46 and 48 which are extensible and retractable relative to each other for tipping the back frame 14 forwardly and rearwardly, respectively. The members 46 and 48 are stamped out of relatively inexpensive metal sheet or plate stock. The other or rearward extremity of the first member 46 is pivotally attached to the depending mount 44 of the back frame 14, while the outer or forward extremity of the second member 48 is pivotally attached to the mounting tab 30 which depends from the forward portion of the seat frame 12.

The second member 48 actually comprises a pair of coextensive, laterally spaced apart elements 50 between which the inner extremity of the first member 46 is longitudinally slidable. As best seen in FIG. 10, the first member 46 includes a pair of longitudinally spaced apart elongate guide slots 52 in its outer portions. A middle portion of the member 46 is larger in transverse cross section, thereby defining an abutment or shoulder 54 whose purpose will subsequently become apparent.

A pair of pins or rivets 56 are disposed through transverse openings in the pair of members 48. Their ends are upset to retain them in position, as shown in the detailed showing of FIG. 5. The central portion of each rivet 56 is larger in diameter than the diameter of the rivet extremities. It is longitudinally slidable within the slots 52 and restricts the relative movement of the members 46 and 48 to longitudinal extension and retraction.

The back frame 14 is biased to an upright position by a compression spring 58 which acts at one extremity against the shoulders 54 of the first member 46, and at its opposite extremity against a transverse spring retainer 60. The retainer 60 extends between the forward extremities of the pair of elements 50 and includes an arcuate central portion. A rivet 62 extends through the adjacent elements 50 and through the retainer central portion, being upset at its ends to fix it in position. The bias of the spring 58 against the shoulders 54 and spring retainer 60 tends to tip the back frame 14 forward, and the occupant adjusts the rearward inclination of the back frame 14 simply by pushing it back against the bias of the spring 58. When the desired angle of inclination is reached, the occupant reaches down and manipulates a generally forwardly extending portion of a handle 64, as seen in FIGS. 1 and 2.

Figure 3:
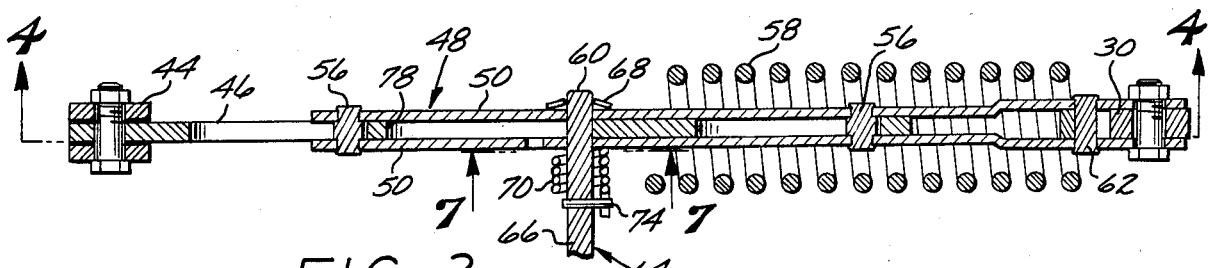
FIG. 3 is a view taken along the line 3—3 of FIG. 2.
Figure 4:
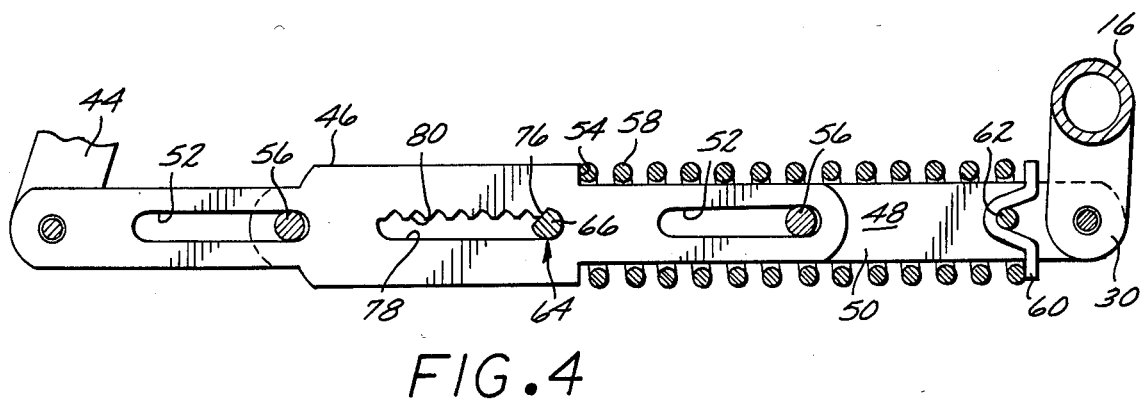
FIG. 4 is a view taken along the line 4—4 of FIG. 3.

The handle 64 includes a transverse engager portion or element 66 pivotally carried within suitable transversely aligned openings in the pair of elements 50, as best seen in FIG. 3. A suitable retaining fastener 68 receives the protruding or free end of the element 66 and bears against the face of the adjacent element 50, cutting into the element 66 and constraining it against movement out of the illustrated position.

The handle 64 is biased counterclockwise to the position illustrated in the several views by a torsion spring 70 disposed about the handle element 66. The inner end of the spring 70 is disposed within an outwardly projected portion 72 punched out of the adjacent element 50. The opposite or outer end of the torsion spring 70 is constrained against rotation relative to the handle element 66 by a transverse pin 74 which extends through the handle element 66 for engagement by the outer end of the spring 70.

The inner extremity of the handle element 66 is made of circular rod stock which is flattened or cut away to define an arcuate cross-section having a flat 76, as best seen in FIGS. 6 through 9. The handle element 66 extends through an elongate slot 78 in the first member 46. The upper margin of the slot 78 includes or defines a plurality of longitudinally spaced apart recesses or detents 80, each of which is characterized by a sloping, flat, and rearwardly oriented face.

Figure 6:
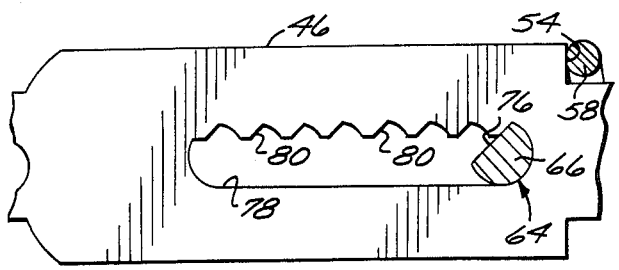
FIG. 6 is an enlarged side elevational detail view showing the elongate slot and the associated handle element engageable with detents of the slot.
Figure 5:
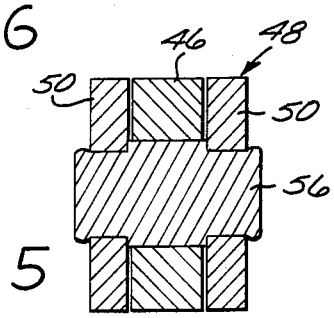
FIG. 5 is an enlarged view taken along the line 5—5 of FIG. 2.

In the locking position of the handle 64 illustrated in the several views, the bias of torsion spring 70 rotates handle element 66 and urges the face 76 thereof into engagement with the complemental flat face of one of the detents 80. As seen in FIGS. 6 and 9, when handle 64 is rotated from the locking position of FIG. 6 to the release position of FIG. 9, the flat 76 of handle element 66 disengages the complemental flat face of the adjacent detent 80, and handle element 66 is freely longitudinally slidable within the slot 78.

In operation, assuming the chair occupant wishes to incline the back frame 14 at a greater angle, handle 64 is depressed beyond the illustrated position to a release position (not shown) in which the handle element 66 is oriented as seen in FIG. 9. Pushing against the back frame 14 then retracts or telescopes member 46 between the pair of elements 48 and aligns the handle element 66 with a more rearwardly located one of the detents 80. Release of the handle 64 then allows the torsion spring 70 to rotate the handle element 66 into the locking position of FIG. 6, thereby maintaining the back frame 14 at selected angle of inclination.

As best seen in FIGS. 7 and 8, the openings in the elements 50 are preferably formed with a pair of flat margins or abutments 82 and 84 which act as stops to prevent the handle element 66 from rotating beyond the release and locking positions of FIGS. 6 and 9. Thus, abutment 84 prevents torsion spring 70 from urging the handle element 66 in a counterclockwise position beyond the locking position. More importantly, the abutments 82 also prevent handle element 66 from rotating in a clockwise direction beyond the release position of FIG. 9. Rotation beyond the latter position would undesirably seat element 66 in one of the detents 80 in a way that would prevent backward movement of the back frame 14 despite actuation of the handle 64.

With reference to FIGS. 10 through 12, a different arrangement of handle 64a and elongate slot 86 is illustrated, the remaining components being substantially identical to the first embodiment. Accordingly, like numerals are employed to designate like elements, the subscript "a" being used to denote similar elements.

The elongate slot 86 is characterized by opposite longitudinal margins defining a pluralities of confronting, longitudinally spaced apart detents 88 and 90, respectively.

The detents 88 and 90 are adapted to receive the opposite extremities or camming portions 92 and 94 of a cam 96 which is suitably fixed to a handle element 66a of a handle 64a. In addition to this fixed attachment, relative rotation between the cam 96 and the element 66a is prevented by interengagement of flats on the element 66a with complemental margins of the opening in the cam 96 through which the element 66a extends.

Cam 96 is specially configured to perform a function similar to the function of the abutments 82 and 84 of the first embodiment, that is, to prevent handle 64a from being rotated beyond the desired release and locking positions.

The opposite edge margins of the camming portions 92 and 94 are preferably arcuate to seat easily within the detents 88 and 90, each arcuate surfaces sliding over the complemental arcuate portion of the detent 88 or 90. This arcuate portion confronts the flat or abutment portion of each detent.

Extending between the arcuate edge margins of the camming portions 92 and 94 are longitudinal edge margins 90 spaced apart a distance less than the width of the slot 86, enabling relative longitudinal movement of handle 64a along the slot 86 during movement of the back frame 14 toward the upright position.

The edge margins 98 are cut away or relieved to provide recesses having oppositely directed flat faces or abutments 100 which are engageable with the flat edge margins of the detents 88 and 90, respectively.

With this arrangement, rotation of the handle 64a from the locking position of FIG. 10 to the release position of FIG. 12 allows the back frame 14 to be pivoted toward an upright position. Upon release of handle 64, the bias of torsion spring 70 moves caming portions 92 and 94 into engagement with the flat margins of the detents 88 and 90, as seen in FIG. 10. This locks back frame 14 in a selected position of inclination. In this way the modified handle 64a provides a more rugged means for assuring against rotation of handle 64 beyond its release and locking positions.

From the foregoing it will be seen that an easily operable recliner mechanism has been provided which is capable of fabrication out of relatively inexpensive plate and rod stock, and which is adapted for extended, maintenance-free operation.

Various modifications and changes may be made with regard to the foregoing detailed description without departing from the spirit of the invention.

I claim:

1. A recliner mechanism comprising:
elongated first and second members including outer extremities having a pair of pivot means for attachment to a back frame and to a seat frame, respectively, for adjusting the angle of inclination of the back frame relative to the seat frame upon extension and retraction of said first and second members relative to each other, said second member including a pair of coextensive, generally parallel elements spaced apart to define an elongated slideway, the inner extremities of said elements terminating inwardly of said pivot means of said first member, said first member including an elongated slot having side margins defining a plurality of detents, said first member being longitudinally movable within said slideway, the inner extremities of said elements terminating inwardly of said pivot means of said first member, and the inner extremity of said first member terminating inwardly of said pivot means of said second member;
a compression spring exteriorly disposed about said second member and acting against said first member and thereby tending to extend said first and second members relative to each other; and
a handle pivotally carried by said second member and including an engager portion within said slot, said handle extending laterally of said second member and having a release position wherein said engager portion is freely longitudinally movable in said slot to enable relative extension and retraction of said first and second members, and a location position, wherein said engager portion is located in one of said detents to constrain said first and second members against said relative extension and retraction.

2. A recliner mechanism according to claim 1 and including a pair of elongated, longitudinally spaced apart guide slots in said first member, and a pair of transverse pins carried by said second member and extending through said guide slots, respectively, to constrain said first and second members against relative movement other than longitudinal movement.

3. A recliner mechanism according to claim 1 and including a torque spring engaged upon said handle and said second member and operative to bias said handle toward said locking position.

4. A recliner mechanism according to claim 1 wherein said engager portion is generally circular in cross section and characterized by a diameter greater than the narrowest width of said slot, said cross section including a flat portion aligned with said slot, thereby defining a narrower cross section with a diameter less than said width, said flat portion being engaged upon a margin of one of said detents in said locking position of said handle subsequent rotation of said handle in a predetermined direction.

5. A recliner mechanism according to claim 4 wherein said flat portion of said engager portion extends through a limit opening in said second member, said limit opening being characterized by a marginal portion engaged by said flat portion of said engager portion in said release position and preventing rotation of said handle in a direction opposite said predetermined direction.

6. A recliner mechanism according to claim 1 wherein certain of said detents are defined by one of said side margins of said slot oppositely of others of said detents defined by the other of said side margins of said slot, said engager portion having a cam adapted in one position of rotation to move longitudinally along said slot in said release position, and adapted in another position of rotation to engage oppositely located ones of said detents in said locking position.

* * * * *

UNITED STATES PATENT AND TRADEMARK OFFICE
CERTIFICATE OF CORRECTION

PATENT NO. : 4,579,386

DATED : April 1, 1986

INVENTOR(S) : James A. Rupp and John M. Bramhall

It is certified that error appears in the above-identified patent and that said Letters Patent is hereby corrected as shown below:

Column 5, line 48, delete "90" and insert "98"

Signed and Sealed this

First Day of July 1986

[SEAL]

Attest:

DONALD J. QUIGG

Attesting Officer

Commissioner of Patents and Trademarks